United States Patent [19]

DeZubay et al.

[11] Patent Number: 4,480,930
[45] Date of Patent: Nov. 6, 1984

[54] PULSE COOLED THERMOCOUPLE SYSTEM FOR HIGH TEMPERATURE MEASUREMENT ESPECIALLY IN COMBUSTION TURBINES

[75] Inventors: Egon A. DeZubay, Mt. Lebanon; Kenneth D. Weeks, Acme, both of Pa.

[73] Assignee: Westinghouse Electric Corp., Pittsburgh, Pa.

[21] Appl. No.: 484,786

[22] Filed: Apr. 14, 1983

[51] Int. Cl.³ ............................ G01K 1/16; G01K 13/02
[52] U.S. Cl. .................................... 374/134; 364/557; 374/144; 374/165; 374/170
[58] Field of Search ............... 374/134, 144, 170, 137, 374/179, 163, 147, 110; 165/37; 364/557

[56] References Cited

U.S. PATENT DOCUMENTS

| | | | |
|---|---|---|---|
| 2,933,708 | 4/1960 | Elliot et al. | 374/110 X |
| 3,596,518 | 8/1971 | Kirkpatrick | 374/166 X |
| 3,776,039 | 12/1973 | Bowen | 374/134 X |
| 4,023,411 | 5/1977 | Escher | 374/147 X |
| 4,102,387 | 7/1978 | Matulich et al. | 165/37 X |
| 4,306,293 | 12/1981 | Marathe | 364/557 |

FOREIGN PATENT DOCUMENTS 0796668  1/1981  U.S.S.R. ............... 374/134

OTHER PUBLICATIONS

"The Pulsed Thermocouple for Gas Turbine Application", J. Odgers et al., 1/77, Engineering for Power.
"A New Approach to the Pulsed Thermocouple for High Gas Temperature Measurements", Glave et al., NASA, (1976).

Primary Examiner—Daniel M. Yasich
Attorney, Agent, or Firm—E. F. Possessky

[57] ABSTRACT

A pulsed coolant thermocouple temperature measuring system is arranged to measure temperature above a limit operating temperature of the thermocouple includes a rake which is disposed across a hot gas path combustion turbine. Multiple thermocouple are disposed in respective channels in the rake to sense the temperature of hot gas from surplus which enter the thermocouple channels through respective sampling ports in the rake. The sample gas flows merge with a common channel and exhaust through a hot gas sample valve. When any of the thermocouples reaches a limit temperature, a coolant valve is opened as the hot gas valve is closed so as to drive coolant air into the common channel over the thermocouple through the thermocouple channels and the sampling ports into the hot gas path. A microcomputer receives and records the thermocouple signals and generates control signals to sequence the coolant and gas sample valves on and off as a function of the thermocouple temperature signals so the system is cycled through successive temperature reading periods without exceeding a predetermined temperature limit of the thermocouples. The microcomputer extrapolates the actual gas temperature as the endpoint temperature computed by a fast integrating method from the recorded thermocouple readings.

6 Claims, 6 Drawing Figures

PULSE COOLED THERMOCOUPLE SYSTEM FOR HIGH TEMPERATURE MEASUREMENT ESPECIALLY IN COMBUSTION TURBINES

BACKGROUND OF THE INVENTION

The present invention relates to temperature measuring systems and more particularly to commercially useful combustion turbine thermocouple systems in which the high gas temperature to be measured is estimated from signals generated by the thermocouple which is being operated in the gas stream but is cooled to operate at lower tolerable temperatures.

High gas inlet temperatures in combustion turbines have been measured with the use of thermocouples such as the ANSI type K (Chromel Alumel alloy by Hoskins Manufacturing Company) which has a reliable operating temperature up to about 2200° F. Life expectancy of the thermocouple is shortened or limited by melting when it is operated at higher gas temperatures.

The use of thermocouple (TC) cooling to obtain estimated measurements of higher gas temperatures thus enables (1) the measurement of gas temperatures which are near or above the TC melting point and (2) a substantial and economizing extension of TC operating life in the measurement of higher gas temperatures which are below the TC melting point and above the reliable operation temperature limit of the TC.

The basic operation of a TC system, in which high temperatures are estimated, involves some form of periodic cooling of the TC and a computation of the actual gas temperature from multiple TC signals taken over a period of time during which the TC is exposed to the hot gas without cooling.

In a January 1977 Engineering For Power article entitled "The Pulsed Thermocouple for Gas Turbine Application" by J. Odgers, D. Kretschmer and A. F. Schlader, there is described an experimental type system in which a mechanical method of TC cooling is employed. The TC is inserted into a hot gas stream when temperature signals are to be generated and recorded, and the TC is withdrawn from the hot gas stream for cooling before it reaches its designated limit operating temperature. While mechanical cooling of this kind is workable, it is not desirable in industrial applications like combustion turbines. In the Odger et al. article, the concept of estimating the actual gas temperature by extrapolation from the transient TC readings is set forth and validated for accuracy of the estimating procedure. Basically, an analog electric circuit employs operational amplifiers which require an extensive calibration procedure to enable the estimations to be made.

In a 1976 NASA paper entitled "A New Approach to the Pulsed Thermocouple for High Gas Temperature Measurements" by G. E. Glave, H. A. Will and L. N. Krause, there is described a system in which hydrodynamic TC cooling is employed (with the use of a small singularly dedicated local air cooling tube) and in which the extrapolation computation is carefully verified (with the use of time consuming statistical methods). However, the system described is basically a laboratory-type system in which an off-line computer is used to make the temperature extrapolation. Obtaining temperature estimates is thus time consuming and impractical for operating industrial equipment.

While the prior art demonstrates the validity of the basic concepts described, there has been no system developed which is characterized with TC coolant control and data acquisition and processing which enables rapid temperature measurement and rapid cycling for multiple temperature measurements as needed in combustion turbine and other industrial applications.

SUMMARY OF THE INVENTION

A pulsed coolant thermocouple temperature measuring system for industrial apparatus in which the temperature of a hot fluid is to be measured at temperature values up to and above a predetermined thermocouple operating temperature limit, said system comprising a support member having at least one channel therein and being supportable in said hot fluid, a thermocouple unit disposed in said channel and having a junction disposed for sensing the hot fluid temperature, means for directing coolant fluid in proximity to said thermocouple junction to a discharge, a coolant valve for controlling the thermocouple coolant flow, computing means for processing and recording measured temperatures from successive thermocouple signals in real time, means for coupling said thermocouple to said computing means, means for coupling said computing means to said coolant valve, said computing means responding to said thermocouple signals to open said coolant valve and cool said thermocouple when the thermocouple temperature reaches a predetermined value, said computing means responding to said thermocouple signals to close said coolant valve to enable a new temperature reading cycle after the thermocouple has been cooled to a lower temperature, and said computing means having means for extrapolating an endpoint temperature corresponding to the actual fluid temperature from the measured temperatures in each temperature reading cycle.

DESCRIPTION OF THE PREFERRED EMBODIMENT

Figure 1:
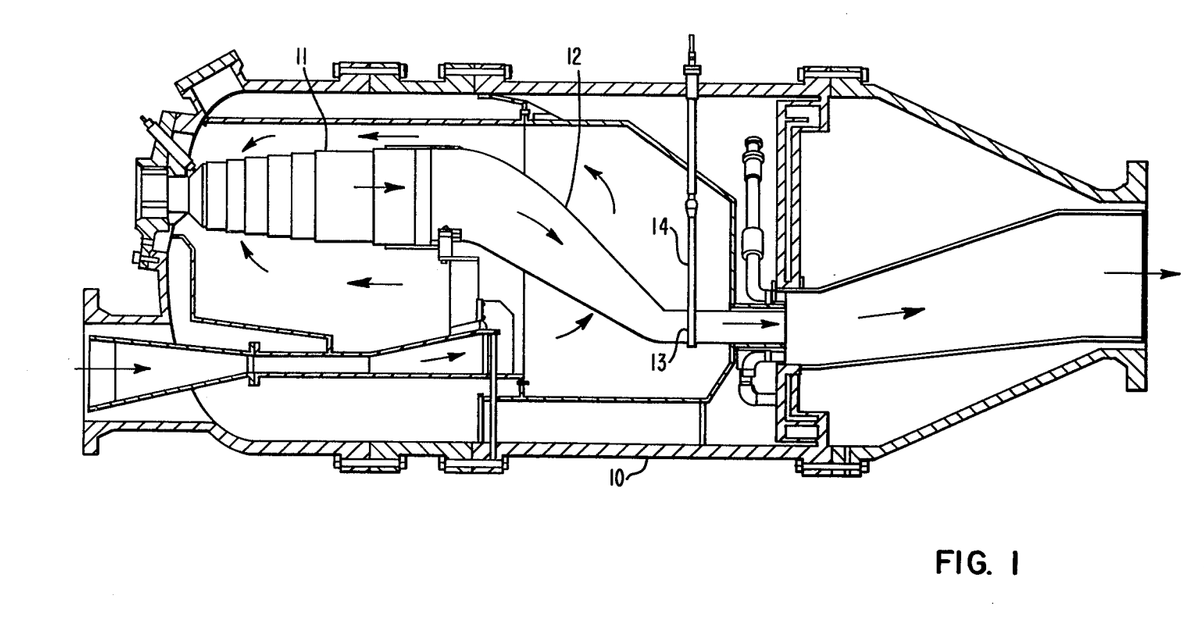
FIG. 1 shows a cutaway elevational view of a combustor test rig in which a thermocouple system is supported to measure temperatures of hot gas from the combustor in accordance with the principles of the invention.

More particularly, there is shown in FIG. 1 a combustor test rig 10 in which a combustor 11 and transition duct 12 are mounted and in which thermocouple units (TC) (seven in this case) form a part of a TC temperature measuring system 17. The TCs are mounted inside a rake 13 which is disposed across the hot gas outlet flow path from the combustor 11 and transition duct 12.

Conductors from the TCs are extended to the rig exterior in a tube 14 for data processing, and coolant is supplied through the tube 14 for pulsed cooling of the TCs in the rake 13. The disposition of the combustor 11, transition duct 12 and the TC rake 13 and the tube 14 in the rig 10 is very much like their disposition would be as one of sixteen peripherially disposed combustor assemblies within the casing of a large electric power generating combustion turbine (not shown).

The rake 13 is employed to permit multiple points across the hot gas path to be measured for temperature simultaneously thereby enabling a temperature profile to be obtained. The rake body also permits a single coolant path to be employed for all of the TC's (seven in this case).

Figure 2:
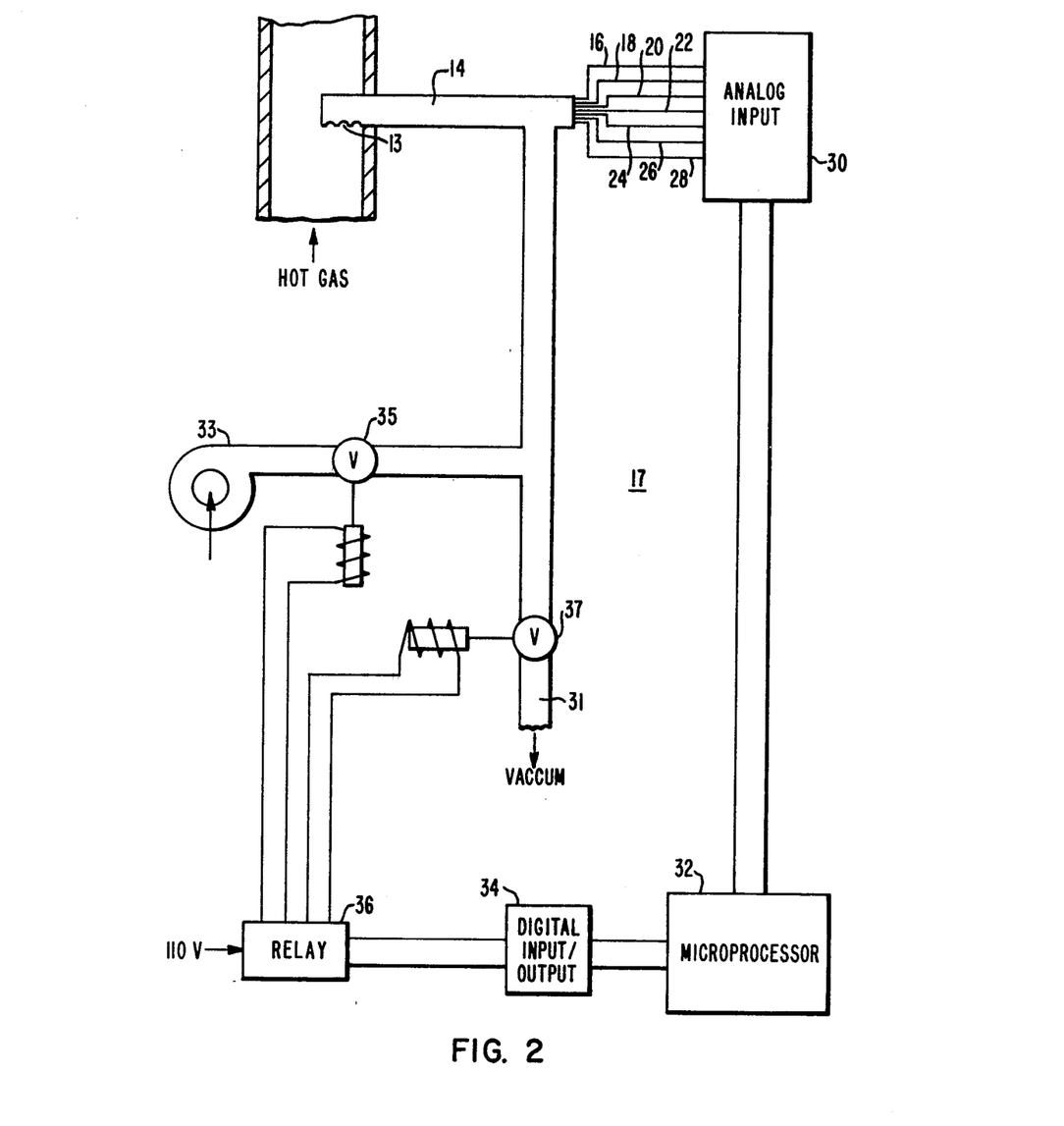
FIG. 2 shows a schematic representation of the thermocouple temperature measuring system referred to in FIG. 1.

In FIG. 2, the coolant pulsed TC system 17 is shown as arranged in accordance with the principles of the invention. It includes thermocouple units 16, 18, 20, 22, 24, 26, and 28 which are disposed within the rake 13 and the tube 12 and coupled to an analog input board 30 for a microcomputer 32.

Figure 2A:
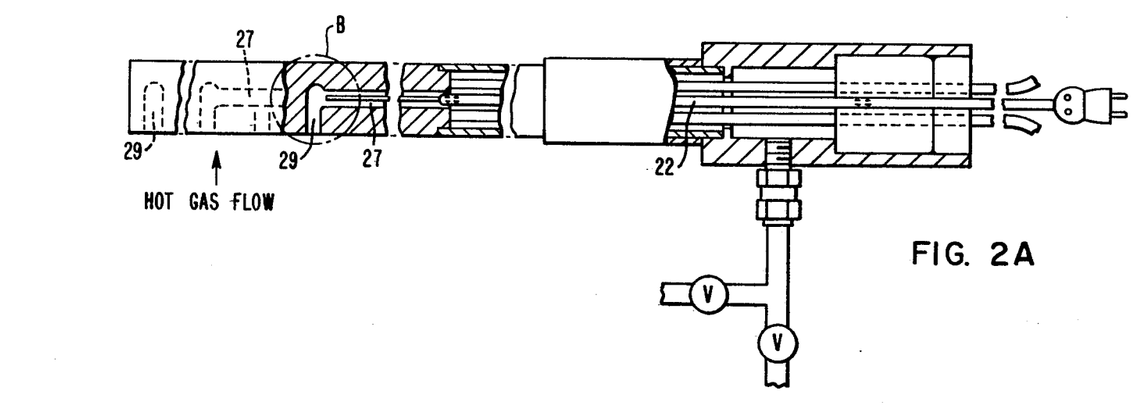
FIGS. 2A and 2B show cutaway views of a rake and thermocouples housed within it to illustrate the disposition of thermocouples within the rake and the way in which hot gas sampling and thermocouple cooling occurs.
Figure 2B:
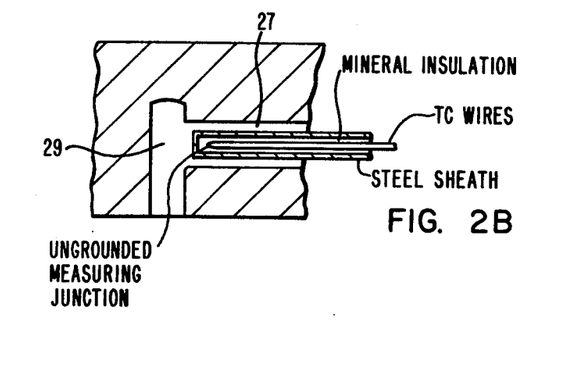

As shown in FIGS. 2A and 2B, each TC is supported within a rake channel 27 which has an end portion or sampling port 29 open to the hot gas (i.e. facing upstream). When the TCs are being cooled, coolant flows through the rake channels along the TC units to the channel ports 29 where it discharges into the hot gas path. When the coolant is turned off, hot gas enter the respective channel ports 29 and flow over the TC units and through the rake channels to an outlet 31 (FIG. 2).

The microcomputer 32 operates through a digital input/output board 34 to operate a coolant valve 35 and a hot gas sample valve 37 through a relay 36. A pump 33 drives cooling air through the valve 35 and the rake 13 when the computer 32 generates a coolant valve open signal. Simultaneously, the hot gas sample valve 37 is closed.

When a TC temperature measurement is again to be taken, the computer closes the coolant valve 35, opens the hot gas sample valve 37 and records successive TC signal levels until the actual hottest TC temperature level reaches the value at which TC cooling is again required and the cycle is then repeated. The recorded TC signal levels in each cycle are used to compute the extrapolated value of the actual hot gas temperature.

If the recorded temperature does not exceed the temperature limit, the actual temperatures are used. The recording sequence is preferably automatically terminated when successive temperatures repeat.

The use of air cooling has advantages over the mechanical retraction cooling method particularly since fast application and withdrawal of cooling is more easily provided with air cooling so as to enable rapid cycling of the TC system operation.

As will become more apparent herein, the TC system 17 provides improved high temperature measurement capability and correspondingly improved combustion turbine operating economy and reliability through automatically cycled cooling, faster data acquisition and faster extrapolation (seven TC histories have been measured and extrapolated in a cycle time of less than 12 seconds). As a result, continuous high temperature monitoring at higher temperatures as well as improved transient temperature monitoring are enabled in combustion turbines and other industrial equipment.

Generally, the pulsed thermocouple (PTC) concept involves the transient behavior of an alternately heated and cooled body—in this case the thermocouple junction—to provide data which can be extrapolated to steady state conditions which would exist after indefinite thermocouple exposure. While this principle has been recognized for a long time, it has not been harnessed into a practical operating system in which TC data is collected and processed to obtain quickly the steady state values.

In the PTC concept, the sensor need only be exposed to the damaging environment of the engine for short periods of time and can thus be kept below its failure limits. It thus provides a means for directly measuring conditions in the critical areas of the combustion turbine without having to infer those conditions from indirect measurements. It also makes it possible to use inexpensive thermocouple materials in areas which would otherwise require costly sensors. Finally, the thermocouple can be kept well below its operating limits to reduce thermocouple failures and enhance gas turbine availability.

In operation, the TC junction is exposed to the hot gas stream and the time/temperature history of the thermocouple heat-up is recorded. When the temperature of the thermocouple reaches its practical limit, the junction is returned to the cooling mode.

The TC temperature transient is extrapolated to equilibrium conditions (i.e. the steady-state actual hot gas temperature). Thus the equilibrium temperature that the PTC would have reached is without actually exposing the PTC to damaging temperature operating conditions.

Figure 3:
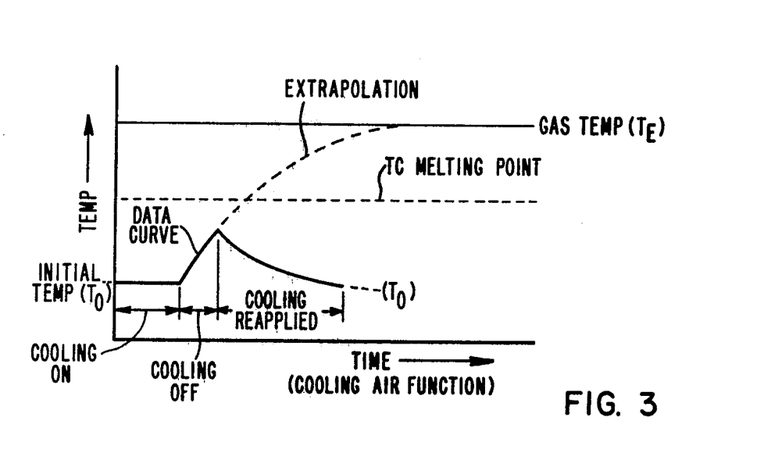
FIG. 3 shows a temperature-time plot which illustrates the TC operating cycle.

The manner in which temperature measurements are generated by the system 16 is more fully illustrated in FIG. 3 where there is shown an operating cycle on a temperature-time plot. TC cooling and gas sampling are provided as previously described.

The uppermost horizontal line represents the gas temperature ($T_E$) (equilibrium) which is to be determined analytically and the dotted horizontal line just below represents the possible melting point temperature of the thermocouple material. This temperature could be below the gas temperature or full temperature to be determined. The initial temperature, $T_O$, represents the portion of the curve during the coolant time period and is the level to which the individual thermocouples are cooled before the heat-up or "pulse" by the hot gas stream.

Figure 4:
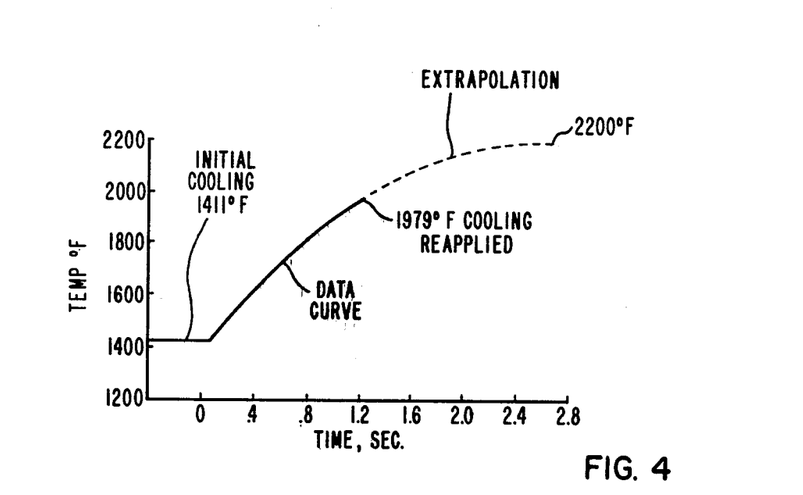
FIG. 4 shows a plot of gas temperature as measured and extrapolated by the coolant pulsed thermocouple system.

At the time of measurement, the thermocouple rake 13 is exposed to the hot gas stream temperature ($T_E$). The temperature is recorded from $T_O$ along the heating curve to the cut-off temperature $T_L$ at several intervals (see FIG. 4). To accomplish this, the cooling air is turned off and when the probe temperature reaches an intermediate temperature point, the rake is returned to the cooling phase. The temperature transient or heating curve for each thermocouple is extrapolated by the computer 32.

The microcomputer 32 is programmed to perform the following basic functions through the described input/output boards:

1. record the time and temperature of each TC measurement;
 2. extrapolate the end temperature from the series of measured temperature for each TC;
 3. cycle the cooling air on and off at the proper times; and
 4. generate a readout of the results on demand.

In the operation of the TC system 16, the extrapolation of temperature is based on the assumption of an exponential temperature curve (which results where convective heat equation terms are predominant). Program testing was done to verify the neglectable influence of other terms including gas radiation, wall radiation and thermocouple wire conduction, and thus to verify exponential behavior for the TCs.

In the prior art, extrapolation calculations have been made on a statistical basis as already indicated. The basic exponential equation is derived as follows (with a convectively heated TC with a cylindrical junction):

$$(CP*L*\pi*RHO*D**2/4)(dT/dt) = L*\pi*D*h*(TE-T)$$

$$dT/(T-TE) = -4h/(D*CP*RHO)$$

$$T = TE - (TE-TO)*EXP(-K*t)$$

where
$$K = D*CP*RHO/4/h$$
The boundary conditions of:
T=TO, t=0
T=TE, t=infinity The time consuming method of maximized coefficient of correlation has been used as a statistical basis of extrapolation. Its linearized logarithm form is:

$$LN(TE-T) = LN(TE-TO) - K*T.$$

If a number of temperature observations totaling "n" in number with the intervening values of temperature (Ti) are made at times (ti), the correlation coefficient "RC" can be expressed as:

$$Rc = \frac{n*\overset{n}{\Sigma}ti*LN(TE-Ti) - \overset{n}{\Sigma}ti*\overset{n}{\Sigma}LN(TE-Ti)}{(X)*(W-Z)}$$

where:

$$X = n*\overset{n}{\Sigma}(ti2) - (\overset{n}{\Sigma}ti)2$$

$$W = n*\overset{n}{\Sigma}(LN(TE-Ti)**2)$$

$$Z = (\overset{n}{\Sigma}LN(TE-Ti))**2$$

Then TE in the above equation can be varied until "RC" attains a maximum absolute value. This approach employs a computer program which searches for the maximum value of "RC" as "TE" is varied.

The problems inherent in calculating an equilibrium temperature on a statistical basis essentially involve estimating of the equilibrium temperature, forming the difference between the estimated equilibrium and the temperature measured at each time increment for all the time intervals between ramp initiation and the temperature cut off point, and finally calculating the correlation coefficient. The computational scheme must be repeated until the correlation coefficient is maximized. Inherently such a scheme is time consuming.

In the fast coordinated operation of the TC system 16 in a combustion turbine, an integral solution method is employed to make extrapolation calculations, i.e. a solution is employed in which two integrals of temperature history are formed as the data is taken.

The first is preferably taken from the initiation time to the first temperature that exceeds a specified fraction of the temperature difference between the thermocouple cut-off point and the initiation temperature. This integral is stored.

The integration then continues, preferably to the cutoff point. Hence two equations are formed consisting of the integral based on the actual measurements equated to the integral of equation 1 for the two sets of readings previously stated. These two equations contain two unknowns—the equilibrium temperature TF and the reciprocal of the time constant "K". These two transcendental equations are solved with a Newton Raphson solution method. This approach has been found to be superior and computationally requires about one-tenth the time of the correlation optimization method.

More particularly in the improved integration method:

$$T = TE - (TE-TO)*(EXP(-K*t))$$

which can be integrated as:

$$\int_o^t T*dt = \int_o^t (TE - (TE-TO)*EXP(-K*t))*dt$$

Then IA the integral of the above equation from t=O to t=A becomes:

EQ. 1
$$IA = \int_O^A T*dt = TE*A + (EXP(-K*A) - 1)*(TE-TO)/K$$

And IB from t=O to t=B becomes:

EQ. 2
$$IB = \int_O^B T*dt + TE*B + (EXP(-K*B) - 1)*(TE-TO)/K$$

In principle, Equations 1 and 2 are solvable for TE and K since IA and IB can be determined from numerical integration techniques of the temperature time history of the thermocouple. Integration over two intervals is necessary to obtain the two Equations 1 and 2.

Since the thermocouple cannot attain its equilibrium temperature but must be limited to its maximum allowable operating temperature (TL), the time required to attain this limit represent the interval "A". A lower temperature, for example about 70 percent of "TL", is used to determine the second integration interval "B". The integral (IA) is evaluated between (TO) to t=0 and (TL) at t=A. Simpson's rule is used to evaluate the integral from the test data which provides sets of temperature (Tn) at times (tn). The expression for IA is:

$$IA = A*(TO + 4*T1 + 2*T2 + 4*T3 - 2*T(n-2) + 4*T(n-1) + Tn)/(3*n)$$

Where: (Tn) would have the value of (TL) the maximum temperature that the thermocouple could endure.

The value of IB would be evaluated over a smaller interval (B) containing "m" points, where Tm=0.7*TL (approximately) at value of t=B. Hence, IB is in the form of:

$$IB = B*(TO + 4*T1 + 2*T2 + 4*T3 - 2*T(m-2) + 4*T(m-1) + Tm)/(3*m)$$

For the evaluation of both IA and IB the number of intervals between TO and Tn or Tm must be an even interval (n&m).

Once IA and IB are evaluated, Equations 1 and 2 can, in turn, be expressed in the following form:

$$TE(1)+(IA*K-TO+TO*EXP(-K*A))/(K*A-1+EXP(-K*A)) \quad \text{EQ. 3}$$

and similarly:

$$TE(2)=(IB*K-TO+TO*EXP(-K*B))/(K*B-1+EXP(-K*B)) \quad \text{EQ. 4}$$

Hence Equations 3 and 4 contain two variable (TE and K) which in principle are solvable by varying "K" until TE(1)=TE(2). An error function is therefore defined as:

$$PHI = TE(1) - TE(2) \quad \text{EQ. 5}$$

and using the Newton-Ralphson method to solve the error function (PHI) with the appropriate substitutes shown below:

$$PHI=(IA*K-TO+TO*EXP(-K*A))/(K*A-1+EXP(-K*A))-(IB*K-TO+TO*EXP(-K*B))/(K*B-1+EXP(-K*B)) \quad \text{EQ. 6}$$

where the next improved solution for K, "K(j+1)" is:

$$K(j+1)=Kj+2*K(j)*DEL*PHI(K(j))/(PHI(K(j)*(1-DEL))-PHI(K(j)*(1+DEL)) \quad \text{EQ. 7}$$

and DEL is the fractional offset to determine the range of the derivative (0.01 or smaller).

A description of the Newton Ralphson method is found in J. B. Scarborough "Numerical Analysis" 6th ed. 1966-Johns Hopkin Press.

The adequacy of the "m"th value of (K) can be determined from its substitution in Equation 5. If "PHI" calculated from Equation 5 is less than a specified number the solution is adequate. If not, another improved value of (K) is calculated from Equation 7. The process is repeated until the desired degree of adequacy is obtained. Convergence is very rapid, usually requiring five or fewer iterations for a difference of less than 0.05 degrees fahrenheit between TE(1) and TE(2). TE is then calculated from Equation 3 or 4.

With respect to data collection for processing, the microcomputer 32 efficiently schedules the valve operations and the TC signal inputting to coordinate with the fast computational procedures and produce a fast cycle time needed for industrial applications.

When a temperature measurement is scheduled, the computer applies a five volt 50 milliamp signal at the digital output board which turns off the cooling air and allows the hot gas to pass over the thermocouple beads.

The cooling air valve and the exhaust valve, which are respectively normally open and normally closed, require approximately an amp at 120 volt AC. Therefore, a solid state relay is employed in the circuit to actuate the solenoids. The solenoids are fast acting and preferably located as close to the thermocouple probe as possible in order to reduce the ramping of initial temperatures as well as any delay in cooling the thermocouple when temperatures are no longer desired.

Analog millivolt signals are obtained from the thermocouples in the rake 13 which are attached to a jack panel and ultimately to the analog to digital (A/D) board that plugs into the microprocessor 32. Seven thermocouples can be monitored by the microprocessor 32, and the illustrated system has the ultimate capability for several more rakes.

The microcomputer can, for example, be a Digital Equipment Corporation SLI-11/02, a widely used device which is well supported by software. It is compatible with the peripheral devices necessary both for the final product.

The standard software packages most frequently used, FORTRAN and BASIC, generally are unacceptable for this application. FORTRAN, while it is an extremely powerful language which operates very efficiently, requires an extensive amount of overhead memory; therefore, it is not well suited for smaller systems. BASIC, on the other hand, is commonly used on small computers because it does not require a large overhead. However, it is ill-suited for applications requiring very fast response.

To avoid these pitfalls, FORTH is employed as the basis for the thermocouple software in this embodiment. FORTH was developed during the last decade specifically for programming microprocessors for data acquisition and control systems. Various FORTH versions can be fit into 4-8K of memory and it has been demonstrated that a FORTH program runs as fast or faster than the same program written in FORTRAN. A measure of the compactness of a FORTH program is the fact that the present software system for the PTC controller occupies about 3000 bytes of memory.

The basic functions of the PTC program are threefold. The first responsibility of the system is data acquisition. Data from up to seven channels is taken from the A/D device and stored in preestablished zones in memory for later processing. Built into the acquisition commands are cut-off limits which will not permit data to be taken (1) beyond the prescribed limits of the thermocouple material, or (2) beyond the memory which has been set aside for a specific channel.

Tests show that adequate accuracy is achieved with fewer than thirty data points per channel. Therefore, for conditions where small degrees of extrapolation might be required and the time constant for the heating process is unusually long, fifty words of memory are set aside for each channel.

The second basic function of the PTC program is control. The initiation of the data acquisition is triggered by the recognition that the probe has reached a steady state under the cooling medium. The OFF command is sent to the cooling gas control valve, and the CPU enters a very brief "wait" state until the first value from Channel 1 of the A/D device is placed on the Parallel I/O buffer. This value is then moved to the Channel 1 zone in memory and the first item of Channel 2 data is fetched from the buffer. This process is repeated until all seven channels have been polled. The offset into memory is then incremented and the polling operation is repeated. When any of the channels exceeds a pre-set voltage level corresponding to the upper limit on the thermocouple's temperature range, an ON command is generated and the cooling medium is reapplied.

This same event triggers the third basic function of the program—extrapolation and reporting. The data which has been stored for each channel is first converted from a voltage to the temperature equivalent using a polynomial specific to the type of thermocouple in use. The temperature response of the thermocouple is then numerically integrated over the two ranges described for the integral method. The overall performance of the basic program function is such that the system is capable of cycling every 12 seconds or less.

Attached Appendix A discloses program listings employed in implementing the basic program functions.

APPENDIX A

First of all, the PULSTC code is stored on TU-58 DECtape II in the form of screens. Each screen is a 1024 byte block of information which might be data or FORTH code. PULSTC resides in screens 20 through 26. These screens are provided below. To run PULSTC on the VT103, the following steps are taken:

(1) Power up the unit. The RT-11 operating system will automatically be loaded from the SYSTEM tape. The default tape drive must be assigned to the FORTH tape. (.ASSIGN DD1: DK:)

(2) FORTH is actually a program itself, and has been assembled on the FORTH tape as FORTH.SAV. Thus, FORTH is entered using the RUN command. (.RUN FORTH)

(3) After FORTH has been loaded, the system will respond with "OK" after every transmission from the keyboard. At this point SCR 1 is loaded. (1 LOAD) SCR 1 is the loader screen which will extend the FORTH dictionary to include an EDITOR and an ASSEMBLER. It also loads five utility screens developed in order to overcome some of the deficiencies of the FORTH system. Finally, SCR 1 includes a "call" of PULSTC; that is, it will load SCR 20.

(4) SCR 20 will in turn load the remaining PULSTC screens, as can be seen in line 15. When loading is complete, the system will respond with "OK".

(5) The master word for PULSTC, which initiates execution, is simply "GO". GO is the last word defined on SCR 26.

Two types of action can be initiated when a FORTH screen is loaded. The first is to perform so-called "compiling" procedures. For instance, the CONSTANT word used to set up ADDR in SCR 20 actually enters ADDR into the FORTH dictionary and allocates space for a single word of data. But it is different from the VARIABLE word in that it also automatically provides the necessary code to retrieve the contents of the address marked in the dictionary by ADDR. Thus, when a word defined by CONSTANT is used, the value of the constant is placed at the top of the FORTH stack. When a word defined by VARIABLE is used, only the address of that word is retrieved from the dictionary when it is accessed. In order to change the value or to recover the current value either a "store" (!) or a "fetch"(@) must be performed. CONSTANT and VARIABLE are called compiling words. They are themselves run-time procedures, but only insofar as they perform actions on the dictionary. The primary compiling word, which will appear again and again in the following screens, is the colon (:). (To make this perfectly clear, if it is not already, a "word" in FORTH is any set of contiguous characters wich are either a part of the resident FORTH dictionary or are defined subsequently. Thus even (:) is a FORTH word.) A so-called colon definition is a word which is entered into the dictionary but is not executed. To illustrate: if

:SQUARE DUP*.;

were keyed in, FORTH would open a definition called SQUARE in the dictionary which would duplicate the value on the top of the FORTH stack, multiply the top two numbers and then print (.) the result. The next time that SQUARE is entered without the colon, (i.e., 5 SQUARE), the SQUARE procedure would be executed and the system would respond by typing "25". SQUARE is a "run-time" procedure whenever it occurs outside a colon definition. The distinction will become clear by comparing the appearance of COEF in SCR 21 with its initial appearance on line 14 of SCR 20. In SCR 20, an entry in the dictionary called COEF is opened. DMATRIX is another compiling word which sets up a two dimensional double-word matrix. Space is allotted to permit 4×4 or 16 double word entries. A procedure is also included wich finds the desired value in the matrix using the indices preceding the word. Thus when COEF is accessed in SCR 21, the address of the data field of COEF is retrieved and then the offset into the field is computed using the indices. The D! word then performs a double-word store procedure which stuffs the data into the appropriate slots in memory. SCR 21 is the only screen in the loading of PULSTC which performs run-time procedures. All other screens, including SCR 20, only act to extend the FORTH dictionary.

On the following pages, the FORTH screens containing PULSTC are given. Accompanying each listing is a commentary describing in some detail the contents. (Note that in FORTH in-line comments are set off by parentheses.)

SCR #20

```
0   CR."LOADING TASK = PULSTC..." : PULSE ;
1
2   (INITIALIZE VARIABLES AND DIMENSION ARRAYS)
3
4   26000   DUP DUP           CONSTANT ADDR      VARIABLE AO    VARIABLE A1
5   0    VARIABLE TCUT   0    VARIABLE C      0  VARIABLE PTS  0  VARIABLE TPTS
6   0    VARIABLE NCH    1    VARIABLE CH     0  VARIABLE W?      DVARIABLE OLD
7   0    VARIABLE N1     0    VARIABLE TF     0  VARIABLE U?      DVARIABLE TAU
8   1    VARIABLE CNTR   0    VARIABLE IA     0  VARIABLE IB      DVARIABLE X
9   0    VARIABLE K      2    DARRAY          AREA
10
11  (DATA HOLDS 7 CHANNELS OF RESULTS - IT CAN BE INCREASED HERE)
12  7 DARRAY DATA
13  (COEF IS ACCESSED BY < NFIT > < NCOEF >COEF)
14  4 4 DMATRIX COEF
15  21 LOAD 22 LOAD 23 LOAD 24 LOAD 25 LOAD 26 LOAD
```

This screen sets up the necessary working variables and allocates room to store data. The nomenclature list which follows should explain the use of each variable, vector, and matrix.

| NOMENCLATURE | | |
|---|---|---|
| WORD | TYPE | FUNCTION |
| ADDR | CONSTANT | Marks beginning of memory allocated to data storage from the thermocouple channels. Used to reset memory pointer after each cycle. |
| A0 and A1 | VARIABLE | Used in polling sequence and in preparation and conversion of data. |
| TCUT | VARIABLE | Marks cutoff value (either temperature or voltage depending on mode selected). |
| C | VARIABLE | Multipurpose utility variable. |
| PTS | VARIABLE | Stores number of points taken per channel after weeding procedure. |
| TPTS | VARIABLE | Stores total number of points taken per channel. |
| NCH | VARIABLE | Stores number of channels to be polled. |
| CH | VARIABLE | Keeps track of channel being processed. |
| W? | VARIABLE | Toggle set during initiation that permits the user to skip the WEED procedure described below. |
| OLD | VARIABLE | Holds old value of time constant TAU during Newton-Raphson procedure. |
| N1 | VARIABLE | Number of points in the first 60% lump. |
| TF | VARIABLE | Stores value of the final gas temperature. |
| U? | VARIABLE | Toggle set during initiation that permits input in voltage or in temperature. Used to skip conversion procedure if input is in degrees. |
| TAU | VARIABLE | Current value of time constant during Newton-Raphson procedure. |
| CNTR | VARIABLE | Utility variable used as an index to the AREA vector. |
| IA | VARIABLE | Marks beginning of interval for numerical integration of trace. |
| IB | VARIABLE | Marks end of interval for integration. |
| X | DVARIABLE | Double precision integer which stores the result of TE-1 procedure. |
| K | VARIABLE | Value set during initiation to indicate which of four possible types of thermocouples are being used. |
| AREA | DARRAY | Double word vector containing floating point results of the two-lump numerical integration. |
| DATA | DARRAY | Double word vector into which TF and TAU are placed for each channel. |
| COEF | DMATRIX | Four-by-four double word matrix which contains the floating point equivalents of coefficients used in conversion procedure CVT. Each type of thermocouple requires four coefficients. Only the second (Type K) is currently available. |

---

SCR #21

```
0   (COEFFICIENTS OF CUBIC CONVERSION ALGORITHMS FOR THERMOCOUPLES)
1
2   (DATA FOR TYPE K < CHROMEL-ALUMEL > THERMOCOUPLE)
3
4   -2048    18064 2 1 COEF D!   -24576   -14865 2 2 COEF D!
5   -12288   17982 2 3 COEF D!     4224    18829 2 4 COEF D!
6
7
8
9
10
11
12
13
14
15
```

This screen provides room for establishing the values of the coefficients in the voltage-to-temperature conversion CVT (see SCR 23). The floating point equivalents of the third-power equation coefficients are entered into COEF matrix. At this point only the curve fit for a Type K thermocouple has been performed. Thus the first index, which indicates which couple is in use, is in all cases set to 2.

| SCR #22 | |  |
|---|---|---|
| 0 | (SELECTION OF OPTION AND KEYBOARD ENTRY DEFINITIONS) | |
| 1 | | |
| 2 | : ?SET."INPUT VOLTAGE OR TEMP ? <V=1, T=0>"  #IN U? | ! CR |
| 3 | U? @ IF | |
| 4 | ."TYPE OF COUPLE ? <J=1,K=2,R=3,IR=4> "  #IN K | ! CR |
| 5 | THEN | |
| 6 | ."NUMBER OF CHANNELS = ?"  #IN NCH | ! CR |
| 7 | ."MAXIMUM VALUE = ?"  #IN TCUT | ! CR |
| 8 | ."WEED INITIAL DATA ? <Y=1, N=0> "  #IN W? | ! ; |
| 9 | | |
| 10 | : INPUT 0 C ! BEGIN NCH @ 0 DO AO @ I 100 * + #IN SWAP OVER | |
| 11 | MOVE TCUT @ > IF 1 C ! LEAVE THEN LOOP 2 AO +! 1 PTS +! | |
| 12 | PTS @ 48 > IF 1 C ! THEN C UNTIL −1 PTS +! ADDR AO ! | |
| 13 | PTS @ TPTS ! ; | |
| 14 | | |
| 15 | | |

The two words defined in this screen allow the user to select certain options and define the procedure for entering simulated data from the keyboard. The options available should be self-explanatory. The INPUT word, however, deserves more comment. INPUT consists of a loop (BEGIN—UNTIL) which accepts single word data (<32768) in integer form from the keyboard. It moves that data from the serial input buffer and places it at the current value of AO. It also performs the polling operation, looping NCH times through the acquisition procedure. Two cutoff tests are applied. If any value exceeds the specified cutoff value, the acquisition procedure is terminated. Secondly, if that value is not exceeded by the time that 48 values have been entered into the first channel, then the acquisition procedure will be terminated anyway. This prevents one channel writing over data from the next.

| SCR #23 | |
|---|---|
| 0 | (CLEAN-UP AND CONVERSION OF RAE DATA) |
| 1 | |
| 2 | (WEED DISCARDS CONCAVE PORTION AT THE START OF A TRACE) |
| 3 | |
| 4 | : WEED AO @ A1 ! BEGIN 3 0 DO I A1 A@ LOOP OVER SWAP - R - R |
| 5 | WHILE −1 PTS +! 2 A1 +! REPEAT A 1 @ AO @ - PTS @ 0 DO |
| 6 | DUP A1 @ @ A1 @ ROT -! 2 A1 +! LOOP DROP ; |
| 7 | |
| 8 | (CVT CONVERTS FROM VOLTAGE TO DEG F FOR DESIRED TC) |
| 9 | |
| 10 | : CVT CIF 2DUP K @ 1 COEF D@ MULF R R 2DUP 2DUP MULF 16384 |
| 11 | 18204 DIVF K @ 2 COEF D@ MULF R R ADDR R R 2DUP |
| 12 | 2DUP MULF 0 17786 DIVF MULF 0 17786 DIVF K @ 3 COEF D@ |
| 13 | MULF 0 17352 DIVF R R ADDF K @ 4 COEF D@ ADDF |
| 14 | 16384 18204 DIVF CFI ; |
| 15 | |

The two words defined here are accessed later if the the appropriate options are selected during ?SET. WEED examines the beginning of each channel's data in order to determine whether the slope of the trace is increasing. This procedure has been included in order to eliminate transient data as the cooling air is removed from the probe. If an increasing slope is found, then the data are shifted in memory to offset the initial time. The value of PTS for that channel is also decremented. CVT contains the third-power algorithm which converts data from voltage to degrees Fahrenheit. This word uses the COEF matrix described in SCR 22. It can thus be generalized to cover any thermocouple conversion, provided the conversion can be reduced to a cubic fit.

| SCR #24 | |
|---|---|
| 0 | (INTEGRATION DEFINITIONS AND OUTPUT COMMANDS) |
| 1 | |
| 2 | : TRAP IA @ DUP 10 * IB @ DUP 10 * ROT - ROT ROT - / CHS |
| 3 | 0 0 IB @ IA @ 1 + DO I AO A@ S- D D+ LOOP |
| 4 | IA @ AO A@ IB @ AO A@ + 2 / S- D D+ ROT DN* ; |
| 5 | |
| 6 | : INTEGRATE PTS @ 6 10 */ DUP N1 ! - IB ! 0 IA ! TRAP CDIF |
| 7 | 1 AREA D! IB @ IA ! PTS @ 1 - IB ! TRAP CDIF |
| 8 | 1 AREA D@ ADDF 2 AREA D! ; |
| 9 | |
| 10 | : FETCH PTS @ 0 DO I AO A@ I 10 MOD IF . ELSE CR . THEN LOOP ; |
| 11 | |
| 12 | : PRINT CH @ DUP DATA D@ ROT |
| 13 | ."FOR CHANNEL" . CR |
| 14 | ." TEMPERATURE = ".." DEG F "CR |
| 15 | ." TIME CONSTANT = ".." MSEC "CR CR; |

This screen includes the numerical integration procedures, as well as two output commands. The first word actually performs a trapezoidal area calculation from point IA to point IB in the trace. An arbitrary time interval of 10 has been used to eliminate the need for a clock. The fixed data acquisition procedure should provide a constant interval between points, making the computation of the final temperature independent of the interval. INTEGRATE controls the execution of TRAP. It finds and sets the values of IA and IB, thus defining the range of the two area calculations. It also stores the areas in AREA in floating point notation.

Fetch is a diagnostic retrieval word which recovers PTS pieces of data from memory beginning at AO. This is used to check the data storage operations. PRINT is the output word which is used to report the final temperature and the normalized time constant for each channel. It loops through the printing words NCH times.

word calls FACT twice, once for each half, and finds the difference. It also stores the value of FACT in TF in case a solution has been reached.

| SCR #26 | |
|---|---|
| 0 | (CLOSURE ALGORITHM : NEWTON - RAPHSON METHOD) |
| 1 | |
| 2 | : CLOSE SETT BEGIN TAU D@ 0 16944 MULF 0 16928 DIVF TAU D! PHI |
| 3 | OLD D@ 0 16912 MULF 0 16928 DIVF TAU D! PHI - OD D@ |
| 4 | TAU D! PHI DUP ABS 1 < IF DROP DROP 1 ELSE DUP C @ - |
| 5 | 0= IF DROP DROP 1 ELSE DUP C ! 200 ROT */ MINUS 1000 + |
| 6 | CIF TAU D@ MULF 0 17786 DIVF 2DUP TAU D! OLD D! 0 THEN |
| 7 | THEN UNTIL TAU D@ 0 16928 DIVF CFI TF @ CH @ DATA D! ; |
| 8 | |
| 9 | : SOLVE INPUT NCH @ 1+ 1 DO I CH ! U? @ IF PTS @ 0 DO I AO A@ |
| 10 | CVT I AO A! LOOP THEN W? @ IF WEED THEN INTEGRATE CLOSE |
| 11 | 100 AO +! TPTS @ PTS ! LOOP NCH @ 1+ 1 DO I CH ! PRINT |
| 12 | LOOP 0 PTS ! ADDR DUP A1 ! AO ! CR CR CR ; |
| 13 | |
| 14 | : GO ? SET BEGIN SOLVE ." STOP ? <Y=1, N=0> " #IN UNTIL ' |
| 15 | ." JOBNAME = PULSE ...." CR |

This screen contains the Newton-Raphson procedure CLOSE, the word SOLVE which controls the overall flow of PULSTC, and the master word GO which enters an indefinite loop repeating the cycle of SOLVE until the user opts to exit.

CLOSE varies the value of TAU according to the Newton-Raphson method until the absolute value of PHI drops below a value of 1. Since the calculation has been scaled by a factor of one hundred to permit integer arithmetic throughout the program, this is equivalent to an error of 0.1 degrees which is inherent in the method.

SOLVE goes through an entire cycle once. It executes INPUT, then goes through the CVT, WEED, INTEGRATE, and CLOSE procedures. When all channels have been processed, PRINT is executed.

The master word GO simply executes SOLVE as

| SCR #25 | |
|---|---|
| 0 | (EVALUATES ERROR FUNCTION, PHI, F0R A GIVEN TIME CONSTANT) |
| 1 | |
| 2 | : SETT N1 @ 1 - IA ! PTS @ 1 - DUP IB ! 100 FP* 2DUP TAU D! |
| 3 | OLD D! ; |
| 4 | |
| 5 | : E-1 2DUP X D! 0 17786 MULF 2 DUP 10 2 DO X D@ MULF I 10000 |
| 6 | FP* DIVF 2DUP R R ADDF R R LOOP DROP DROP ; |
| 7 | |
| 8 | : TE-1 10 FP* 20480 -14141 MULF TAU D@ DIVF E-1 TAU D@ MULF ; |
| 9 | |
| 10 | : FACT DUP TE-1 2 DUP X D! 10 CIF DIVF ROT 10 * CIF −27008 |
| 11 | 19480 MULF ADDF 0 AO A@ CIF X D@ MULF CNTR @ AREA D@ |
| 12 | −17376 19902 MULF ADDF 2SWAP DIVF ; |
| 13 | |
| 14 | :PHI IA @ FACT 2DUP 0 16928 DIVF CFI TF ! 1 CNTR +! |
| 15 | IB @ FACT SUBF CFI 1 CNTR !' |

This screen sets up the calculation of the error function PHI. SETT initializes the time constant TAU and the holding variable OLD. The next two words, E-1 and TE-1, are used to evaluate the expression $$TAU*(e^{T/TAU}-1)$$

where T is the temperature at the end of an interval and TAU is the current time constant. E-1 performs the operations inside the parentheses. TE-1 multiplies by TAU and scales the calculation. FACT uses TE-1 to evaluate the final temperature; that is, it computes either half of the PHI function as it was given in the Technical Discussion of this memorandum. Since both halves are of the same form, FACT has been generalized. The PHI many times as the user desires. After each cycle the user is given the option to stop. In its final form PULSTC will loop indefinitely through the cycle until an interrupt signal is sent from the operator's panel. This interrupt will be implemented differently, but will be completely analogous to the present form.

We claim:

1. A pulsed coolant thermocouple temperature measuring system for industrial apparatus in which the temperature of a hot fluid is to be measured at temperature values up to and above a predetermined thermocouple operating temperature limit, said system comprising a support member having at least one channel therein and being supportable in said hot fluid, a thermocouple unit disposed in said channel and having a junction disposed for sensing the hot fluid temperature, means for directing coolant fluid in proximity to said thermocouple junction to a discharge, means including a coolant valve for selectively controlling the thermocouple coolant flow, computing means for processing and recording measured temperatures from successive thermocouple signals in real time, means for coupling said thermocouple to said computing means, means for coupling said computing means to said coolant valve, said computing means responding to said thermocouple signals to open said coolant valve and cool said thermocouple when the thermocouple temperature reaches a predetermined value, said computing means responding to said thermocouple signals to close said coolant valve to enable a new temperature reading cycle after the thermocouple has been cooled to a lower temperature, and said computing means having means for extrapolating an endpoint temperature corresponding to the actual fluid temperature from the measured temperatures in each temperature reading cycle.

2. A system as set forth in claim 1 wherein said extrapolating means includes means for calculating an integral solution based on at least two integration periods over the temperature measuring period.

3. A system as set forth in claim 2 wherein said integral solution calculating means includes means employing a Newton-Raphson solution.

4. A pulsed coolant thermocouple temperature measuring system for measuring the hot turbine inlet gas temperature, said system comprising a thermocouple rake having a plurality of channels therein and being supportable in said turbine across the inlet gas flow path, a thermocouple unit disposed in each of said channels for sensing hot gas temperature therein, and means including a coolant valve for selectively controlling the thermocouple coolant flow, computing means for processing and recording measured temperatures from successive thermocouple signals in real time, means for coupling said thermocouple to said computing means, means for coupling said computing means to said coolant valve, said computing means responding to said thermocouple signals to open said coolant valve and cool said thermocouple when the thermocouple temperature reaches a predetermined value, said computing means responding to said thermocouple signals to close said coolant valve to enable a new temperature reading cycle after the thermocouple has been cooled to a lower temperature, and said computing means having means for extrapolating an endpoint temperature corresponding to the actual fluid temperature from the measured temperatures in each temperature reading cycle.

5. A system as set forth in claim 4, wherein said extrapolating means includes means for calculating an integral solution based on at least two integration periods over the temperature measuring period.

6. A system as set forth in claim 5, wherein one integration period is taken from the thermocouple coolant removal timepoint to an intermediate temperature below the cutoff temperature at which thermocouple coolant flow is restored, the second integration period including the integral from the intermediate temperature to the cutoff temperature.

* * * * *